US009238439B2

(12) United States Patent
Huebner et al.

(10) Patent No.: US 9,238,439 B2
(45) Date of Patent: Jan. 19, 2016

(54) STORAGE ASSEMBLY FOR VEHICLE CENTER CONSOLE

(71) Applicant: Ford Global Technologies, LLC, Dearborn, MI (US)

(72) Inventors: Annette Lynn Huebner, White Lake, MI (US); Kristin Ann Hellman, Walled Lake, MI (US); Artur Sakarian, Birmingham, MI (US); Ryan Welch, Ottawa Lake, MI (US); Scott H. Dunham, Redford, MI (US); Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 13/954,236

(22) Filed: Jul. 30, 2013

(65) Prior Publication Data

US 2015/0035308 A1  Feb. 5, 2015

(51) Int. Cl.
*B60R 7/04* (2006.01)
(52) U.S. Cl.
CPC ........................................ *B60R 7/04* (2013.01)
(58) Field of Classification Search
CPC .............. B60R 7/04; B60R 2011/0007; B60R 2011/0094; B60R 11/00; B60R 11/02; B60R 2011/0075; B60R 7/005; B60R 7/043; B60R 11/0241; B60R 2013/0287; B60R 11/06; B60R 1/04
USPC ......... 296/37.8, 24.34; 224/275, 42.32, 42.33
See application file for complete search history.

(56) References Cited

U.S. PATENT DOCUMENTS

| 1,217,243 | A | * | 2/1917 | Tucker et al. ................. 312/184 |
| 2,247,593 | A | * | 7/1941 | Weber ........................... 206/425 |
| 3,528,715 | A | * | 9/1970 | Williams, Jr. ................ 312/184 |
| 4,986,589 | A | * | 1/1991 | McNew ....................... 296/37.8 |
| 5,085,481 | A |   | 2/1992 | Fluharty et al. |
| 5,287,414 | A | * | 2/1994 | Foster .......................... 382/100 |
| 5,424,858 | A | * | 6/1995 | Gillotte ........................ 398/108 |
| 5,721,531 | A | * | 2/1998 | Garver et al. ................ 340/8.1 |
| 5,977,875 | A | * | 11/1999 | Lin et al. ...................... 340/570 |
| 6,761,388 | B2 | * | 7/2004 | Lein et al. ................. 296/24.34 |
| 7,156,232 | B1 | * | 1/2007 | Holson ......................... 206/425 |
| 7,726,527 | B2 | * | 6/2010 | Lota ............................. 224/275 |

(Continued)

OTHER PUBLICATIONS

Outmotoring. Printed May 8, 2013. "Center Console Organizer." Copyright 2002-2013. http://www.outmotoring.com/mini-cooper/mini-cubby-organizer.html. 2 pages.

*Primary Examiner* — H Gutman
(74) *Attorney, Agent, or Firm* — Vichit Chea; Price Heneveld LLP

(57) ABSTRACT

A storage assembly for positioning between vehicle seats, includes an enclosable compartment that has opposing longitudinal sidewalls and opposing lateral sidewalls that are connected to the opposing longitudinal sidewalls to define an interior volume. A plurality of retention features are spaced along an upper edge of the opposing longitudinal sidewalls and the opposing lateral sidewalls. A hanging storage module has a rigid panel suspended in the interior volume and a pair of support elements protrudes horizontally from opposing ends of the rigid panel to removably engage a corresponding pair of the plurality of retention features on a select one of the opposing longitudinal sidewalls and the opposing longitudinal sidewalls. The rigid panel has a side portion configured to vertically hold at least one object.

8 Claims, 13 Drawing Sheets

(56) References Cited

U.S. PATENT DOCUMENTS

| | | | |
|---|---|---|---|
| 7,921,998 B2 * | 4/2011 | Schenker | 206/425 |
| 8,246,097 B2 | 8/2012 | Beyer | |
| 8,448,483 B2 * | 5/2013 | Brant | 70/162 |
| 8,994,534 B2 * | 3/2015 | Zhu et al. | 340/572.8 |
| 2003/0116461 A1 * | 6/2003 | Colloton | 206/425 |
| 2005/0035618 A1 | 2/2005 | Toth et al. | |
| 2006/0187655 A1 * | 8/2006 | Bryerman et al. | 362/154 |
| 2006/0232953 A1 * | 10/2006 | Sanders | 362/98 |
| 2009/0000975 A1 * | 1/2009 | Schenker | 206/425 |
| 2010/0080010 A1 * | 4/2010 | Marui et al. | 362/488 |
| 2010/0084883 A1 | 4/2010 | MacDonald | |
| 2010/0128493 A1 * | 5/2010 | Hipshier et al. | 362/459 |
| 2011/0215605 A1 * | 9/2011 | Spitler et al. | 296/24.34 |
| 2013/0026504 A1 * | 1/2013 | Marx et al. | 257/88 |
| 2014/0119043 A1 * | 5/2014 | Kodama | 362/551 |
| 2015/0136932 A1 * | 5/2015 | Salter et al. | 248/346.05 |
| 2015/0138793 A1 * | 5/2015 | Salter et al. | 362/510 |
| 2015/0138798 A1 * | 5/2015 | Salter et al. | 362/510 |
| 2015/0138801 A1 * | 5/2015 | Salter | 362/510 |
| 2015/0197190 A1 * | 7/2015 | Salter et al. | |
| 2015/0197191 A1 * | 7/2015 | Salter et al. | |

* cited by examiner

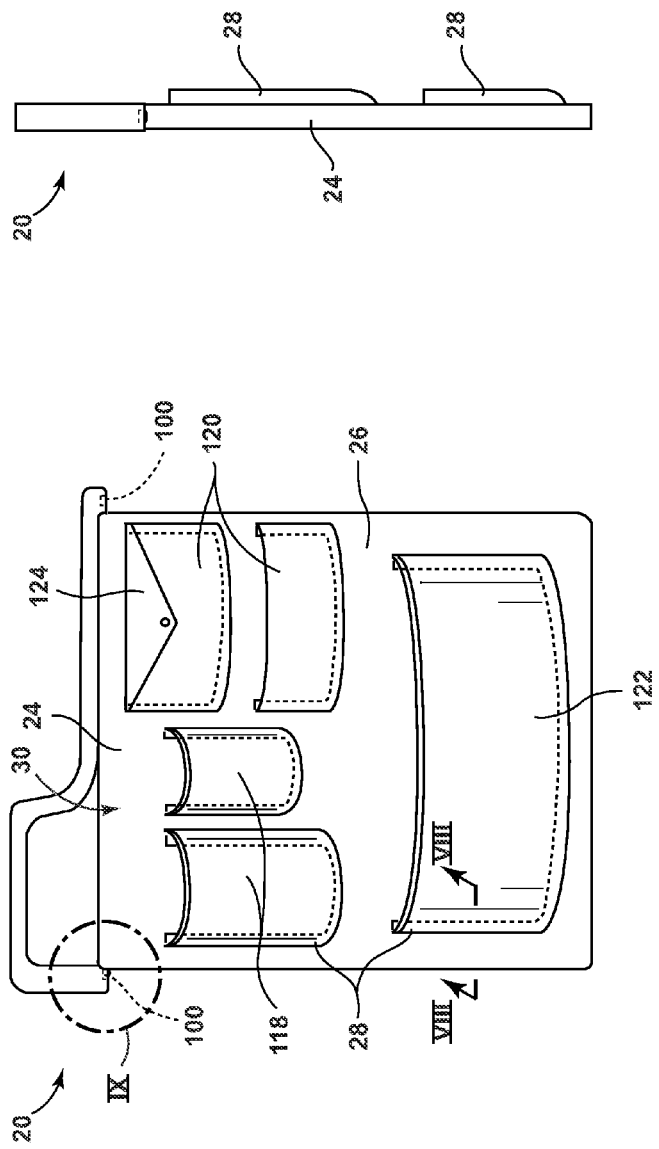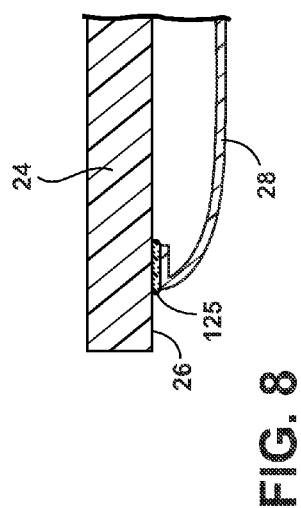

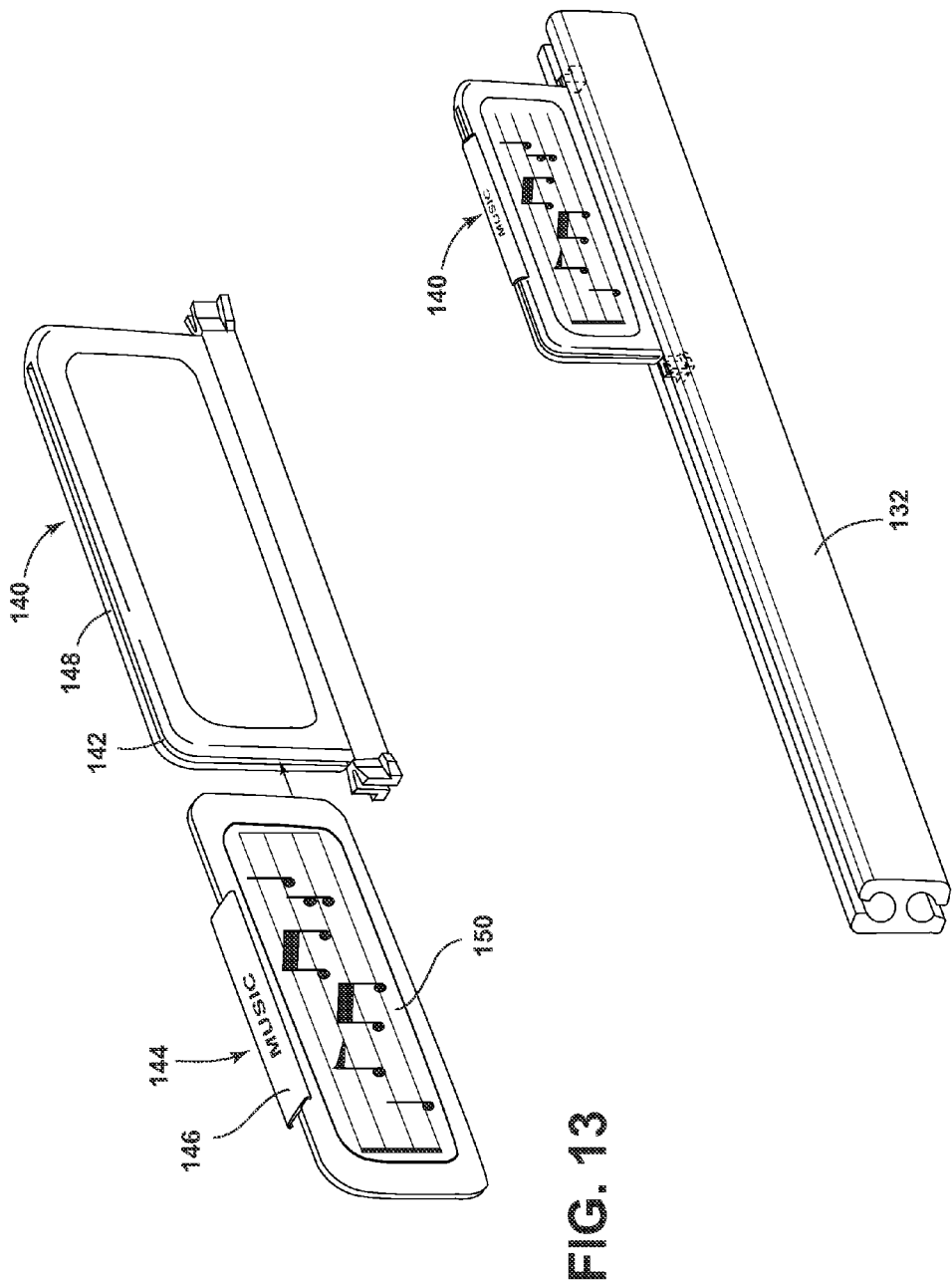

STORAGE ASSEMBLY FOR VEHICLE CENTER CONSOLE

FIELD OF THE INVENTION

The present invention generally relates to a vehicle storage assembly, and more particularly relates to a storage assembly for an enclosable compartment on a vehicle center console.

BACKGROUND OF THE INVENTION

It is common for vehicles to incorporate storage compartments throughout the interior of the vehicle for retaining objects and other devices, such as, portable electronic devices, writing instruments, and other personal items. Frequently, these storage compartments become cluttered and unorganized due to their incompatibility with the size and orientation of the stored objects. For instance, storage compartments with relatively large interior volumes may more easily accommodate larger objects, but these larger compartments may also be less adapted for the organized storage of smaller objects. Likewise, having a number of smaller storage compartments adapted for smaller objects may be difficult to account for stored items in the various enclosed areas. Also, as vehicle occupants increasingly carry and rely upon more portable electronic devices, it is desirable to accommodate the storage and organization of these devices along with other objects. The organization of storage space within vehicles is increasingly desired, as storage space within vehicles is becoming more limited as the overall size of vehicles continues to decrease.

SUMMARY OF THE INVENTION

According to one aspect of the present invention, a vehicle center console includes a compartment having an edge surrounding a cavity. First and second retention features are disposed on the edge on opposing sides of the cavity. An elongated member has first and second ends removably coupled with the first and second retention features. A rigid panel has a side portion with a storage pocket and a top portion coupled with the elongated member to hang in the cavity.

According to another aspect of the present invention, a storage assembly for a vehicle center console includes an enclosable compartment that has a floor and sidewalls arranged around the floor to define an interior volume. Notches are spaced along upper edges of the sidewalls. A hanging storage module has a body portion suspended in the interior volume and a pair of support elements protruding horizontally from opposing sides of the body portion to removably engage a corresponding pair of the notches.

According to another aspect of the present invention, a storage assembly for positioning between vehicle seats includes an enclosable compartment that has opposing longitudinal sidewalls and opposing lateral sidewalls that are connected to the opposing longitudinal sidewalls to define an interior volume. A plurality of retention features are spaced along an upper edge of the opposing longitudinal sidewalls and the opposing lateral sidewalls. A hanging storage module has a rigid panel suspended in the interior volume and a pair of support elements protrudes horizontally from opposing ends of the rigid panel to removably engage a corresponding pair of the plurality of retention features on a select one of the opposing longitudinal sidewalls and the opposing longitudinal sidewalls. The rigid panel has a side portion configured to vertically hold at least one object.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a front elevational view of the hanging storage module;

FIG. 7 is a side elevational view of the hanging storage module;

FIG. 8 is a cross-sectional top view of an edge portion of the hanging storage module, taken at line VIII-VIII of FIG. 6;

FIG. 13 is a top perspective view of a label being inserted into a slot on the vertical tab, according to another embodiment of the present invention;

FIG. 14 is a top perspective view of the vertical tab engaged within the groove of the hanging storage module and having the label insert engaged with the slot;

DETAILED DESCRIPTION OF THE PREFERRED EMBODIMENTS

Figure 1:
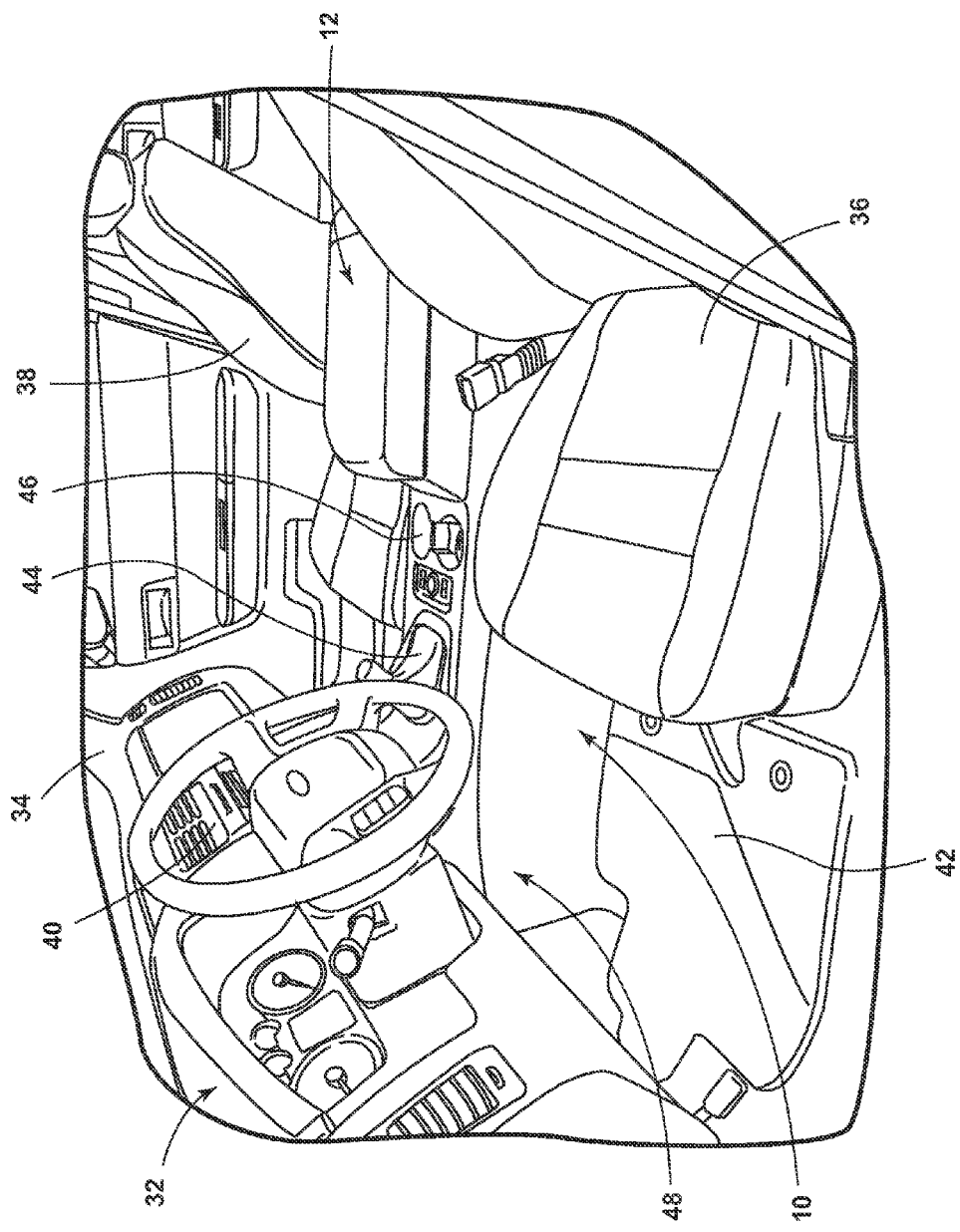
FIG. 1 is a top perspective view of an interior of a vehicle, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-19, reference numeral 10 generally designates a vehicle center console that includes a compartment 12 having an edge 14 surrounding a cavity 16. First and second retention features 18 are disposed on the edge 14 on opposing sides of the cavity 16. A hanging storage module 20 has an elongated member 21 and a rigid panel 24. The elongated member 21 has first and second ends 22 removably coupled with the first and second retention features 18. The rigid panel 24 has a side portion 26 with a storage pocket 28 and a top portion 30 coupled with the elongated member 21 to hang in the cavity 16.

As shown in FIG. 1, an interior 32 of a vehicle 34 is shown according to one embodiment of the present invention. The interior 32 of the vehicle 34 includes a driver seat 36 laterally spaced from a front passenger seat 38 on opposing sides of the vehicle 34. As generally understood in the art, the center console 10 is arranged longitudinally between the driver seat 36 and the front passenger seat 38 and extends rearward from a center stack 40 of the vehicle dash. In the illustrated embodiment, the center console 10 is supported by a floor 42 of the vehicle 34 and is situated forward from any rear passenger seats in the vehicle 34. As illustrated, the center console 10 also includes a shifter 44 and a pair of cup holders 46 positioned forward from the enclosable compartment 12, although it is contemplated that these features may be alternatively positioned on the center console 10 or may otherwise not be included on the center console 10. It is also contemplated that a front section 48 of the center console 10 may not connect with the center stack 40 and that the compartment 12 may be alternatively positioned within the other portions of the vehicle 34, such as within a folded seatback of a center seat, a rear-row of seating, a mid-row of seating, or other areas that may be arranged to include an enclosable storage compartment 12 of the present invention.

Figure 2:
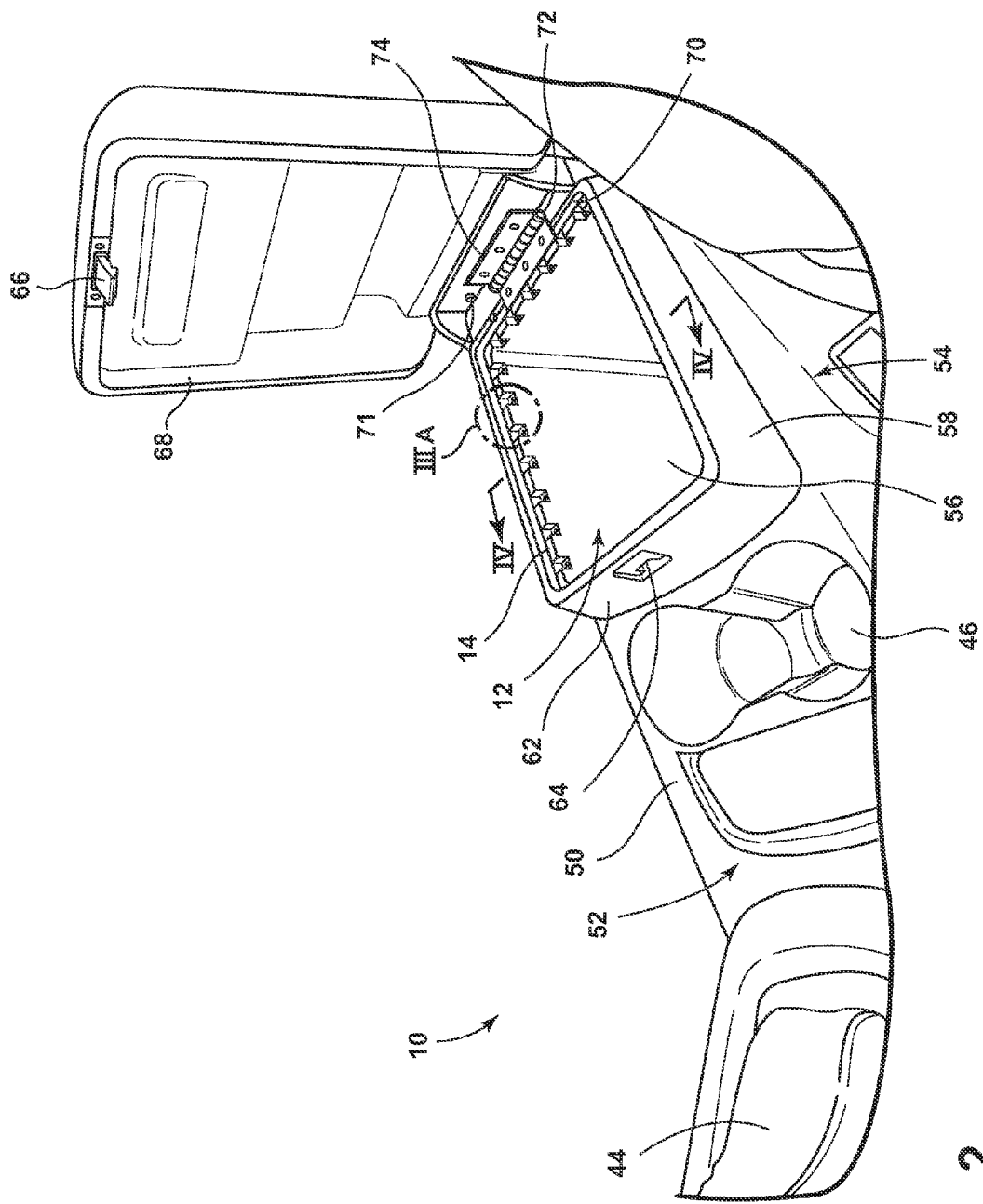
FIG. 2 is a top perspective view of a center console of the vehicle having a lid in an open position to expose the interior volume of the compartment.

As illustrated in FIG. 2, the center console 10 includes a body portion 50 containing the cup holders 46 proximate a center section 52 of the body portion. A rear section 54 of the body portion 50 houses an interior volume 56 of the compartment 12, and more specifically, a trim piece 58 protrudes upward from the body portion 50 and boarders the upper edge 14 of the compartment 12. The interior volume 56 of the compartment 12 extends down from the exterior surface of the body portion 50 and terminates at a floor 60 (FIG. 4) of the compartment 12. A forward edge 62 of the trim piece 58 has a receiving aperture 64 for receiving and retaining a latch 66 on a lid 68 that has a consistent surface sized to span over the interior volume 56 and enclose the compartment 12. The lid 68 is pivotally coupled with a rear edge 70 of the container 12 and is pivotal between a closed position (FIG. 1) that substantially encloses the upper opening of the compartment 12 and an open position (FIG. 2) for providing access to the interior volume 56 of the compartment 12. A small button 71 is positioned near a rear portion of the lid 68 and is arranged on an interior surface of the lid 68 such that it is depressed against a corresponding protrusion on the rear edge 70 of the container 12 when the lid 68 pivots to the closed position (FIG. 1). The small button 71 may positioned in various locations on the lid or the container and may be utilized as an indicator as to whether the lid is in the open or closed position. In the illustrated embodiment, the lid 68 pivots about a lateral axis 72 defined by a hinge 74 arranged outside the upper edge 14 of the compartment 12, pivotally attaching the rear section 54 of the compartment and the rear portion of the lid 68. However, it is also contemplated that the pivotal axis 72 may be employed in an alternative location or arrangement, such as a gooseneck hinge or other conceivable pivotal arrangements generally understood by one having ordinary skill in the art. Further, it is understood that the compartment 12 may be enclosable by an alternative means including a slidable lid, multiple lid enclosures, or a type of a detachable lid.

Figure 3:
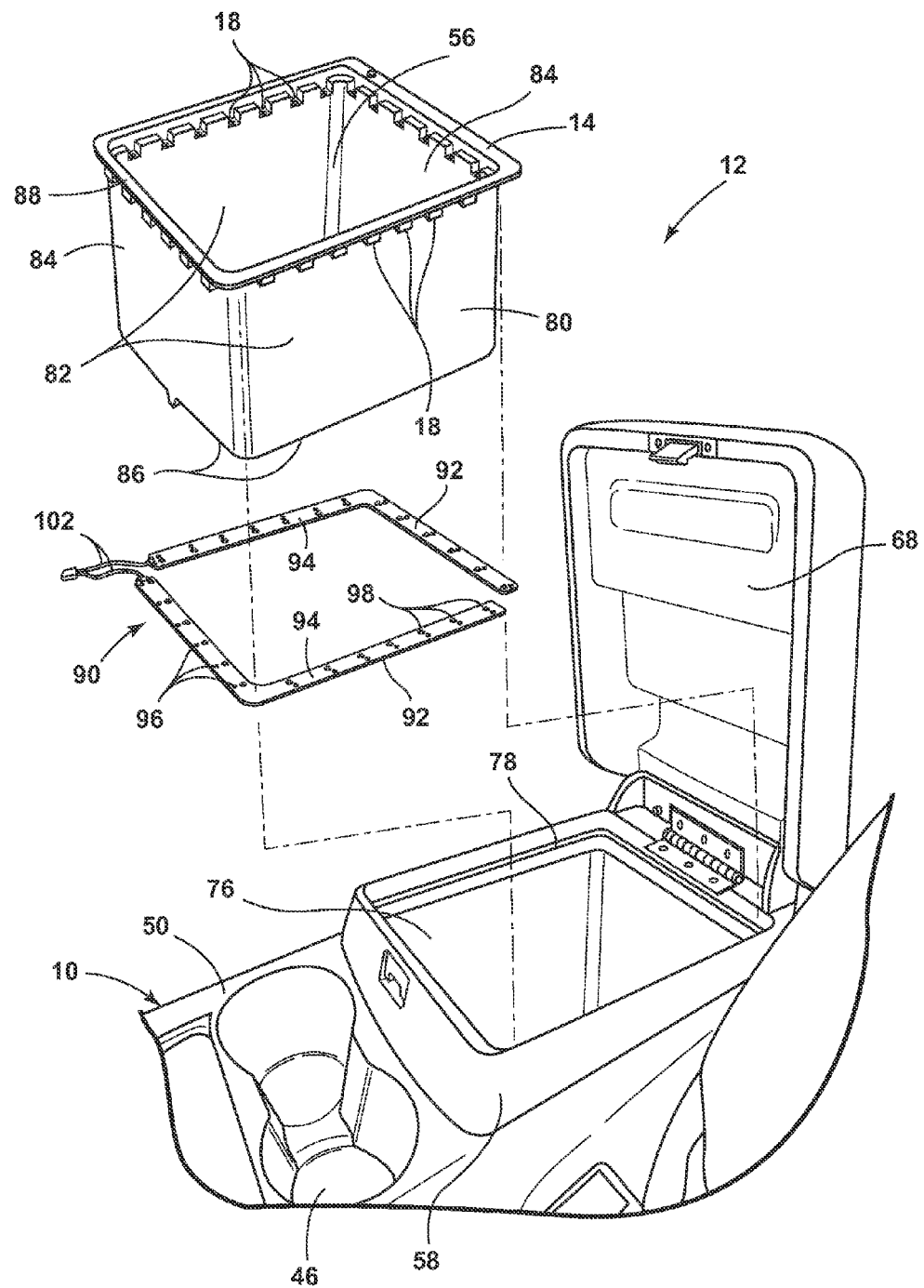
FIG. 3 is an exploded top perspective view of a storage assembly that includes the compartment in the center console.

Referring now to FIG. 3, the compartment 12 includes an aperture 76 in the body portion 50 that is defined by the trim piece 58 that surrounds the aperture 76. The aperture 76 exposes a hollow interior area of the center console 10, which may contain visually concealed vehicle components, such as ventilation ducts and electrical mechanisms. The periphery of the aperture 76 includes a generally horizontal lip 78 extending inward from the trim piece 58 to supports the upper edge 14 of a storage bin 80 that comprises the interior liner of the compartment 12. The storage bin 80 has opposing longitudinal side walls 82 and opposing lateral side walls 84 that are connected to the opposing longitudinal side walls 82 to frame the sides of the interior volume 56 of the compartment 12. The floor 60 (FIG. 4) of the interior volume 56 attaches around a bottom edge 86 of the opposing longitudinal and lateral side walls 82, 84 to fully enclose the bottom region of the interior volume 56. The upper edges 14 of the longitudinal and lateral side walls 82, 84 have an outward protruding flange 88 that extends orthogonally outward relative to the sidewalls to form a downward facing surface that rests upon the horizontal lip 78 surrounding the aperture 76 in the center console 10. A plurality of retention features 18 are disposed inward from the outward protruding flange 88 that surrounds the upper edges 14 of the opposing longitudinal and lateral side walls 82, 84. The retention features 18 are equally and continuously spaced around the upper edge 14 and are spaced, such that any one of the retention features 18 has a corresponding retention feature 18 in perpendicular alignment across the interior volume 56 on the opposing corresponding sidewall. More specifically, in the illustrated embodiment, the opposing longitudinal sidewalls 82 each have seven similarly spaced retention features 18 and the opposing lateral sidewalls 84 each have six similarly spaced retention features 18 for coupling with the hanging storage module 20, as described in more detail below. It is also understood that the flange 88 may have more or fewer retention features 18.

A light source 90, as shown in FIG. 3, is arranged to couple proximate the retention features 18. More specifically, in the illustrated embodiment the light source 90 includes two L-shaped members 92 each comprising a printed circuit board 94 with separate light-emitting diodes 96 (LEDs) spaced along a top surface thereof to correspond with the spacing of the retention features 18 on the upper edge 14 of the storage bin 80. The printed circuit boards 94 may be alternatively divided or combined into one unitary board, and further, the light sources may alternatively include other lighting means, such as a single light pipe or incandescent light source. In the illustrated embodiment, the printed circuit boards 94 also include magnetic sensors 98 adjacent to each LED 96 for aligning with magnets 100 (FIG. 9) on the hanging storage modules 20, as explained in more detail below. Each L-shaped member 92 also has an electrical cord 102 extending from an end of the printed circuit board 94 to couple with an electrical power source of the vehicle 34. It is contemplated that the electrical cord 102 may have a three-prong connector that also couples with a controller on the vehicle 34, such as via a local interconnect network (LIN) or a controller area network (CAN bus), to receive signals from the magnetic sensors 98 and to operate the LEDs 96 individually, such as by assigning each LED an address on the network, or in any combination. In addition, the light source 90, storage bin 80, and surround trim piece 58, and components thereof may attach to each other using various known attachment means, such as clips, adhesive, tape, or other conceivable attachment means.

Figure 3A:
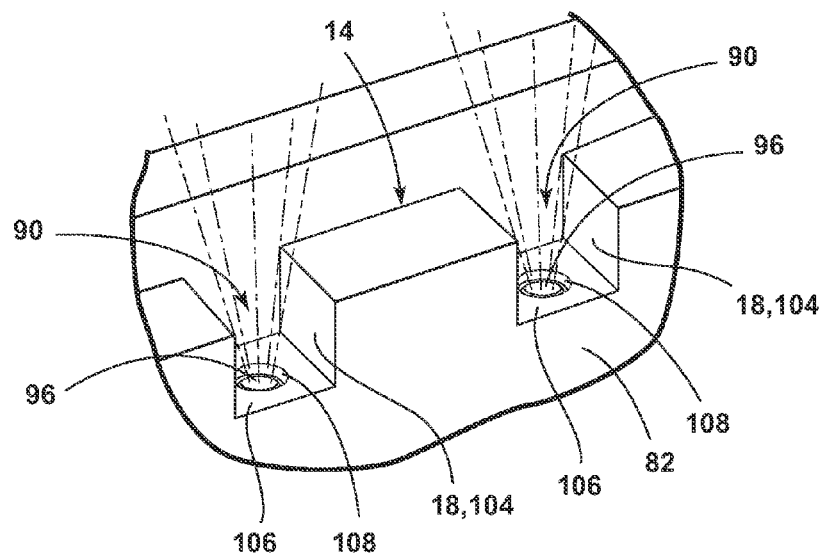
FIG. 3A is an enlarged top perspective view of retention features along an edge of the compartment, taken from section IIIA of FIG. 2.

As illustrated in FIG. 3A, the retention features 18 of one embodiment are cubic notches 104 formed downward from the top surface of the upper edge 14 surrounding the cavity 16 (FIG. 4) and laterally outward from the interior surface of the opposing longitudinal sidewalls 82. A bottom surface 106 of each cubic notch 104 has a centrally located aperture 108 that aligns with the LED 96 of the light source 90. It is conceivable that the light source 90 may be arranged to extend through an alternatively located aperture within the notch 104. Further, it is conceivable that the retention features 18 may be alternatively geometrically shaped and may protrude upward from the top surface of the upper edge 14 and still retain the hanging storage modules 20, as further explained below.

Figure 4:
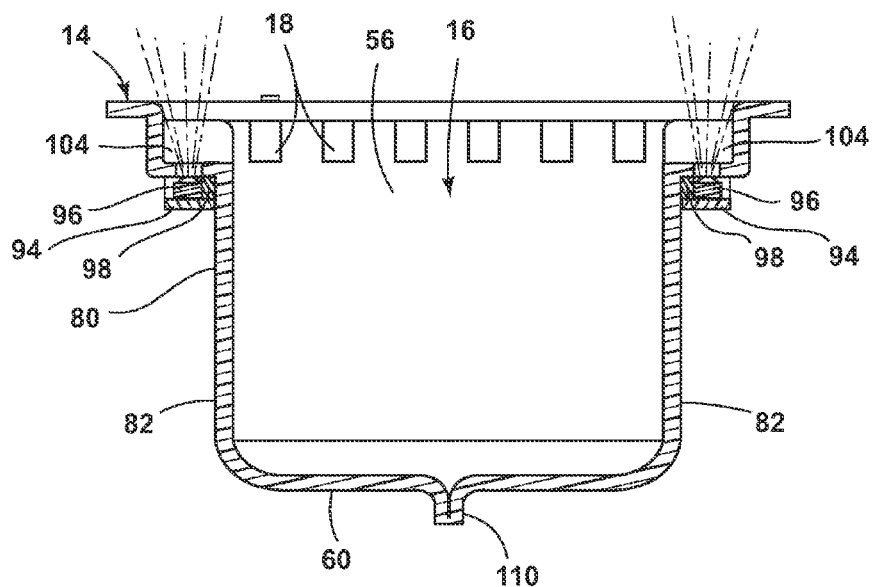
FIG. 4 is a cross-sectional side view of the storage assembly, taken at line IV-IV of FIG. 2.

As shown in FIG. 4, the magnetic sensors 98 are positioned inward from the LEDs 96 on the L-shaped members 92 proximate the transition from the horizontal bottom surface of the notch 104 to one of the substantially vertical sidewalls 82, 84. It is conceivable that the magnetic sensors 98 may be alternatively positioned on the exterior surface of the storage bin 80 to align with the magnets 100 or other magnetic portions on the hanging storage modules 20 (FIG. 6). The storage bin 80 has a downward protruding flange 110 along the underside of the floor 60, which is formed as a result of attaching two halves of the storage bin 80. Accordingly, it is conceivable that the flange 110 may be omitted to provide a consistently smooth floor surface on the interior volume 56. Further it is contemplated that the interior volume 56 may have a varied shape, such having a greater or lesser depth or width or having a floor with a varied geometric configuration. The storage bin 80 is made of a rigid polymer material with a thickness that is small enough to allow the magnet sensor 98 to interface with the magnets 100 on the hanging stage modules 20 (FIG. 9) and large enough to provide the structural strength necessary to hold various objects commonly held in vehicle storage compartments, as generally understood by one having ordinary skill in the art.

Figure 5:
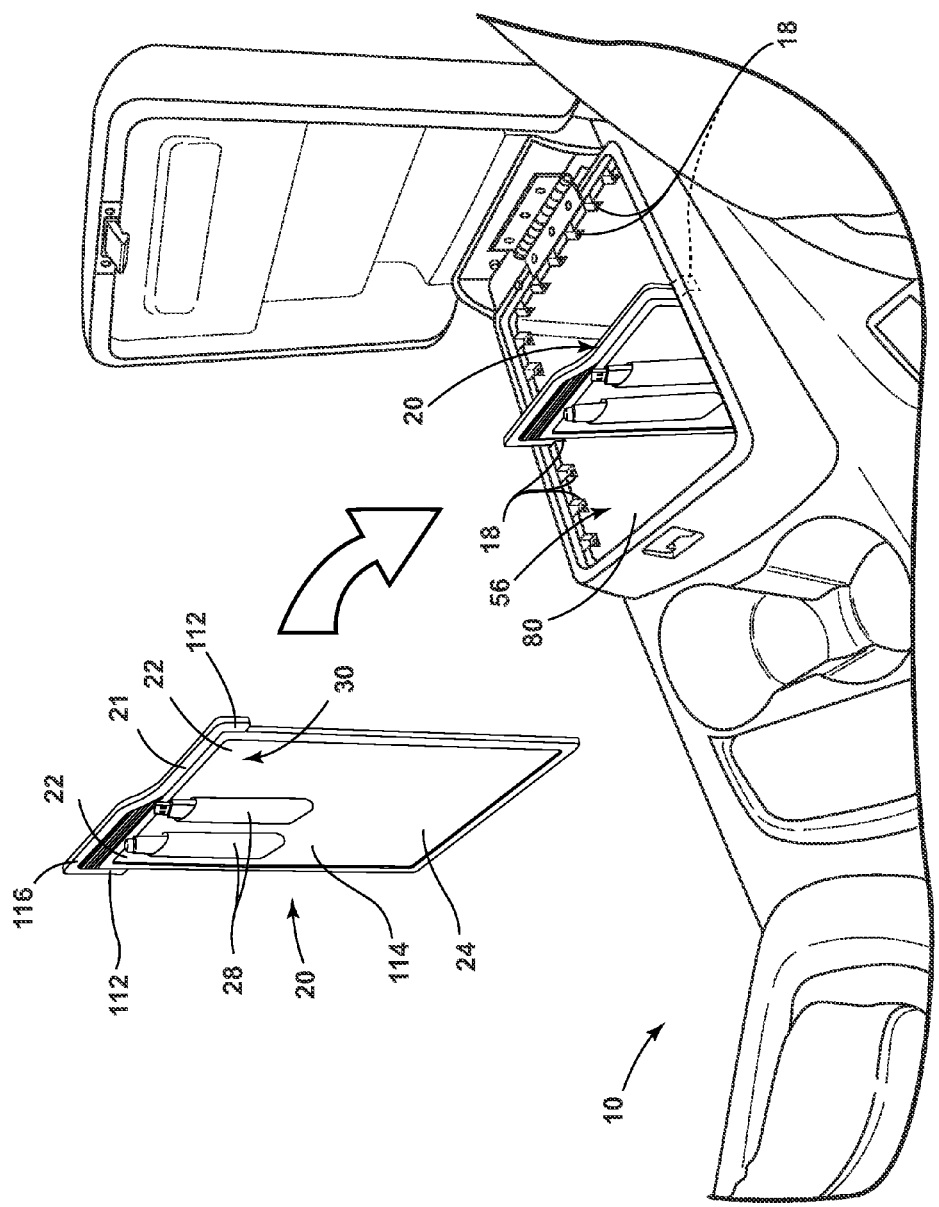
FIG. 5 is a top perspective view of the storage assembly showing a hanging storage module inserted into the interior volume of the compartment.

Referring now to one embodiment of the hanging storage module 20 shown in FIG. 5, the hanging storage module 20 has the rigid panel 24 that suspends within the interior volume 56 of the storage bin 80. An elongated member 21 extends along a top portion 30 of the rigid panel 24 and has a pair of support elements 112 that protrude horizontally from opposing ends 22 of the rigid panel 24. In one embodiment the support elements 112 may be an integral component of the elongated member 21. The support elements 112 are configured to removably engage a corresponding pair of the plurality of retention features 18 on the opposing longitudinal or lateral sidewalls 82, 84 to place the rigid panel 24 in generally perpendicular alignment with the opposing longitudinal or lateral sidewalls 82, 84. A front side portion 114 of the rigid panel 24 has two storage pockets 28 for retaining similarly sized objects. The elongated member 21 on the top portion 30 of the rigid panel 24 includes a tab 116 vertically extending near one of the opposing ends 22 for grasping the hanging storage module 20, removing it from the interior volume 56, and for moving it to an alternative location within the interior volume 56 to engage other retention features 18.

Referring now to FIGS. 6-8, an additional embodiment of the hanging storage module 20 includes a series of storage pockets 28 disposed over a side portion 26 of the rigid panel 24. The pockets 28 may have various shapes and configurations on the side surface including various depths and widths which may accommodate a variety of objects. In the illustrated embodiment, the series of storage pockets 28 include two pockets 118 on an upper left portion that are sized for vertically holding portable electronic devices, such as cell phones or smart phones; two pockets 120 on an upper right portion that are sized to hold items, such as business cards or currency; and an elongated pocket 122 on a lower portion that may also hold a variety of objects, such as writing instruments or cosmetics. The pockets 28 may be enclosable with various enclosures to more securely retain objects within the pockets 28, such as an enclosure flap 124, as shown in one of the pockets 120 on the upper right portion. The pockets may be attached to the rigid panel 24 using an adhesive 125, as shown in FIG. 8, or other attachment means, such as stitching, fasteners, heat welding, or other means as generally understood by one having ordinary skill in the art. It is contemplated that the pockets 28 may be made from a variety of fabrics, leather, rubber, plastic, or other materials, as generally understood by one having ordinary skill in the art. It is also contemplated that the pockets 28 may be formed on both sides of the rigid panel 24 or alternatively only a rear side opposite the front side 26.

Figure 9:
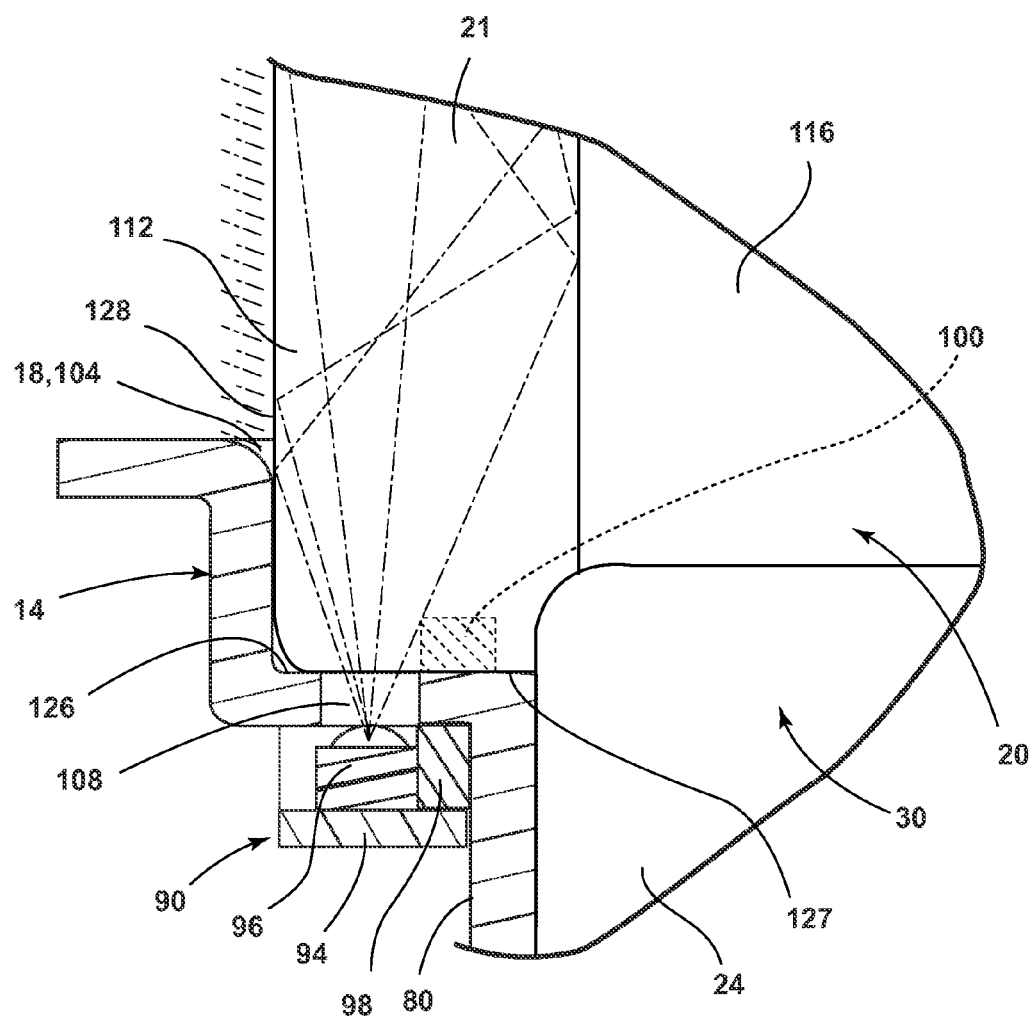
FIG. 9 is a cross-sectional view of a retention feature on the enclosable compartment engaged with a support element on the hanging storage module, taken at section IX of FIG. 6.

As illustrated in FIG. 9, the hanging storage module 20 is removably engaged with a pair of retention features 18, where a downward-facing surface 127 of the support elements 112 abuts an upward-facing surface 126 of the upper edge 14, and more specifically, the bottom surface of the notch 104. The depth of the retention features 18 prevent the hanging storage module 20 from sliding relative to the storage bin 80, such as during operational movement of the vehicle 34 (FIG. 1). In the embodiment illustrated in FIG. 9, the light source 90 emits light though the aperture 108 in the retention feature 18 and into a translucent portion 128 of the hanging storage module 20, thereby illuminating an exterior surface of the translucent portion 128. The translucent portion 128 of the hanging storage module 20 is shown as a generally clear area that borders along an edge portion of the support element 112. The translucent portion 128 may be devoid of material or may include a generally clear material, such as an acrylic light pipe or a side-emitting optical fiber embedded into the support element. Further, in additional embodiments the translucent portion 128 may include the vertical tab 116 or a portion thereof, such that the light transmitted through the translucent portion 128 may scatter beyond the areas illustrated in FIG. 9 to illuminate additional surfaces of the translucent portion 128. For instance, the vertical tab 116 may have a section of the translucent portion 128 that has darkened portions or other features, such as etchings, that could be shaped in wording or symbols to be illumined. Also, the edge portion of the support element 112, having the translucent portion 128 in the illustrated embodiment, may continue around the vertical tab 116 and any remaining portion of the elongated member 21, which, as shown in in the embodiment of FIG. 6, may span along the entire top portion 30 of the rigid panel 24. Accordingly, it is contemplated that the vertical tab 116 or any other conceivable portion of the hanging storage module 20 may include any clear section could be configured to be part of the translucent portion 128 for receiving light from the light source 90 and illuminating that clear section and any features thereon.

As further shown in FIG. 9, a corresponding magnet 100 is embedded within the edge portion of the support element 112, inward from the translucent portion 128, to interact with the magnetic sensor 98 to perform a number of functions including operating to turn the light source 90 between an "on" position and an "off" position. For instance, the circuitry on the printed circuit board 94 may be wired such that when the hanging storage module 20 is engaged and the magnet 100 thereby comes into close proximity with one of the magnet sensor 98, the corresponding LED 96 adjacent to the magnetic sensor 98 is turned from the "off" position to the "on" position, illuminating the corresponding LED 96. Accordingly, when the hanging storage module 20 then is removed and the magnet 100 is no longer in close proximity with the magnet sensor 98, the corresponding LED 96 is thereby returned to the "off" position. As shown in FIG. 6, both support elements 112 have an embedded magnet 100, although it is contemplated that only a single support element 112 may have a magnet 100 to operate both LEDs 96 associated with engaged support elements 112. As generally understood in the art, the magnet sensor 98 and embedded magnet 100 that interface to switch the light source 90 on and off may be replaced by alternative switch interfaces, such as a reed switch, an electrical switch, or a mechanical switch. It is also contemplated that the switch interface may not need to include an embedded component within the hanging storage module 20, and thereby may be entirely contained within the retention feature 18.

Still referring to FIG. 9, operation of the light source 90 may also be influenced by the position of the lid 68 (FIG. 2). For instance, upon depressing the small button 71 (FIG. 2) when the lid 68 moves to the closed position, the light source 68 may be turned to the "off" condition so the interior volume 56 of the container 12 is not illuminated when the lid 68 is closed. It is also contemplated that the light source 68 may be operated by an auxiliary switch, such as a door ajar switch on the vehicle or a designated switch for the light source 90, that may override or work in combination with the small button 71 or other operational features of the light source 90. Further, the LEDs 96 may be configurable to switch between various intensities and colors, such as seven distinct colors derived from red, blue and green. The various colors or intensities may then be assigned to a specific retention feature 18, type of hanging storage module 20, or a customizable selection made by the user. It is also contemplated that the colors or intensities may be altered with changes to other light sources within the vehicle 34, such as changes to the overall color of ambient lighting. It is understood that one skilled in the art may combine these described alternative embodiments to form embodiments within the scope of this invention.

Figure 11:
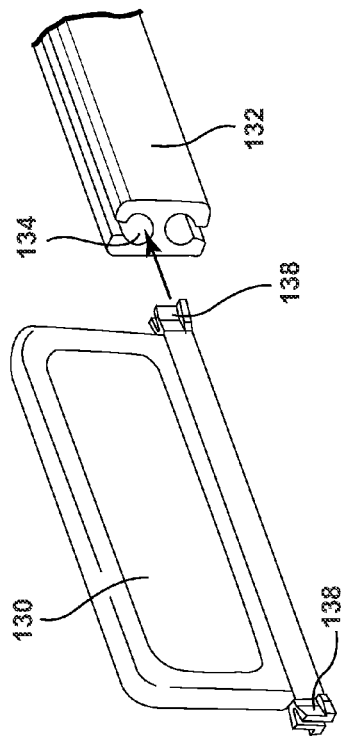
FIG. 11 is a top perspective view of a vertical tab aligned to be slidably inserted into a grove on the hanging storage module.
Figure 12:
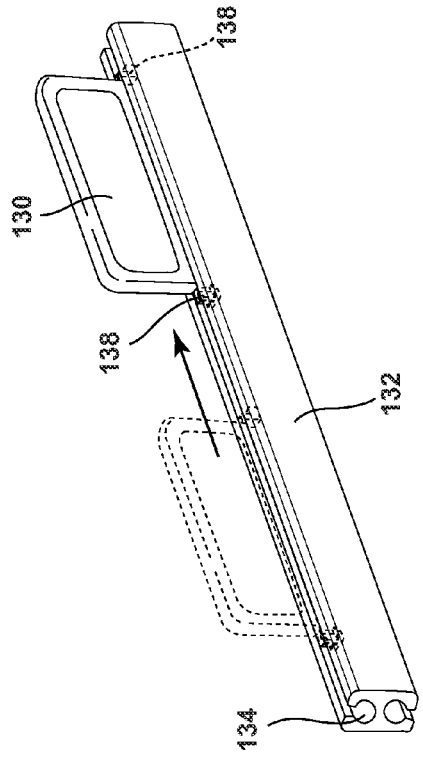
FIG. 12 is a top perspective view of the vertical tab sliding within the grove from a first position to a second position.
Figure 10:
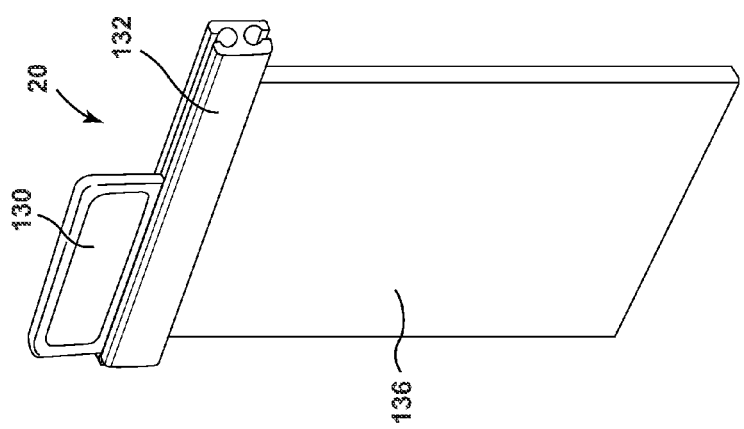
FIG. 10 is a top perspective view of an additional embodiment of the hanging storage module.
Figure 15:
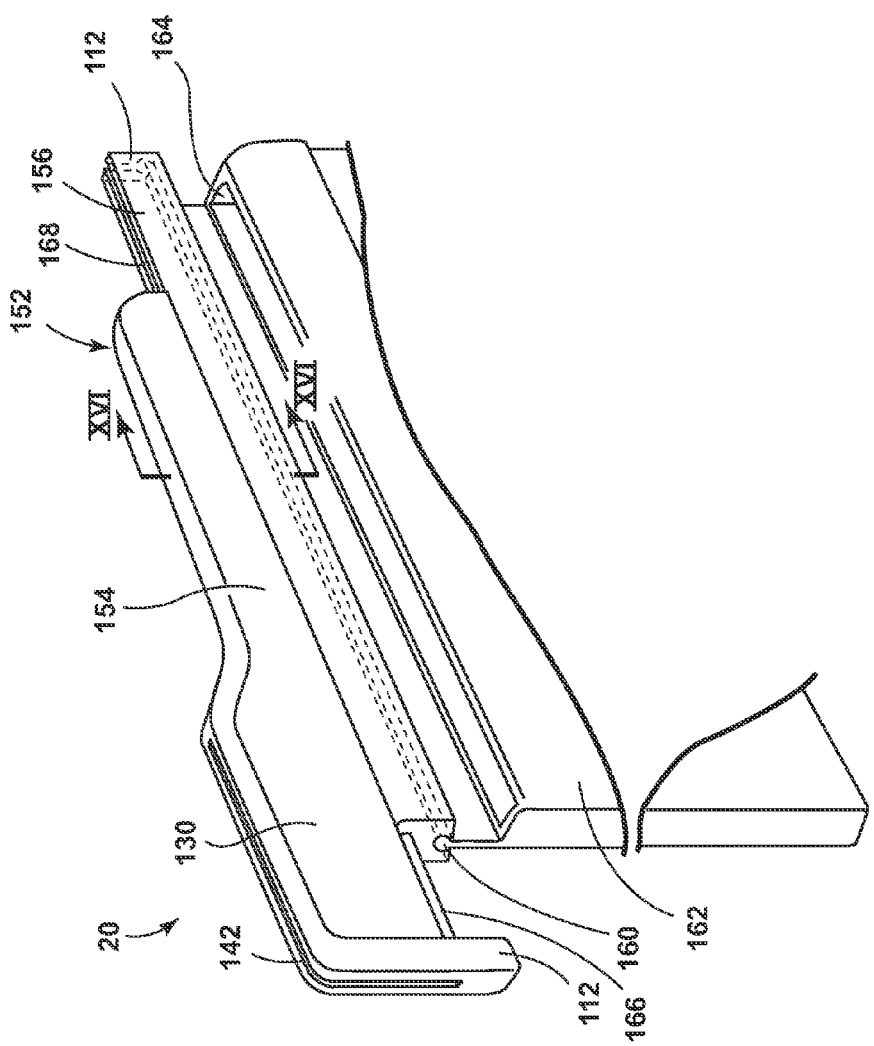
FIG. 15 is a top perspective view of an additional embodiment of the hanging storage module having an elongated member capable of lengthening.
Figure 16:
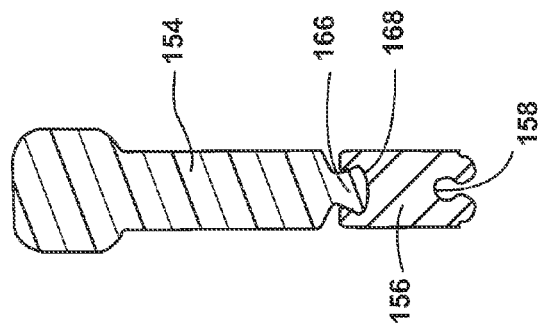
FIG. 16 is a cross sectional view of the elongated member, taken at XVI-XVI of FIG. 15.

Referring now to FIGS. 10-12, an additional embodiment of the hanging storage module 20 has a vertical tab 130 that is slidably coupled with an upper surface of an elongated member 132. More specifically, the vertical tab 130 is slidably coupled within a groove 134 formed along the top edge of a body portion 136 of the hanging storage module 20. Bottom opposing corners of the vertical tab 130 include friction elements 138 that retain the vertical tab 130 at select positions along the groove 134, as shown in FIG. 12. The friction elements 138 in the illustrated embodiment include V-shaped protrusions that extend from opposing ends of the vertical tab 130. The V-shaped protrusions are arranged such that the individual members that constitute the V-shape extend outward from a center line of the groove 134 and are biased outward to frictionally engage a side surface of the groove 134. Therefore, the individual members may be flexed inward toward the center line to be inserted into the groove 134. It is contemplated that the friction elements 138 may have a number of configurations to frictionally retain the vertical tab 130 at a select position on the body portion 136. The coefficient of friction between the frictional element 138 and the groove 134 is configured such that a vehicle occupant can slide the vertical tab 130 along the groove 134 without the use of tools, but the vertical tab 134 does not slide freely under the general operating conditions of the vehicle 34. With the use of multiple hanging storage modules 20 employing the illustrated embodiment of the vertical tab 130, the vertical tabs 130 may be slidably adjusted such that tabs 130 are not visually overlapping the tabs 130 of another adjacent hanging storage module 20, allowing the tabs 130 to be visually identifiable, the information on the tabs 130 to be easily readable, for the tabs 130 to be easily individually accessible.

As shown in FIGS. 13-14, the vertical tabs 140 in another embodiment may include a slot 142 configured to receive a label insert 144 and extending in alignment with the elongated member 132. The label insert 144 may include a top portion 146 that slides above the slot 142 and wraps over an upper surface 148 of the vertical tab 140. The label insert 144 also includes a vertical portion 150 that may be wholly inserted into the slot 142. In one embodiment, the vertical tab 140 may be translucent, such that the vertical portion 150 of the label insert 144 may be readable through the vertical tab 140. Further, one side of the vertical tab 140 may be opaque and may boarder of the vertical tab 140, such as surrounding a translucent window portion to similarly allow wording or designs on the vertical portion 150 of the label insert 144 to be easily discerned through the translucent window portion.

Figure 17A:
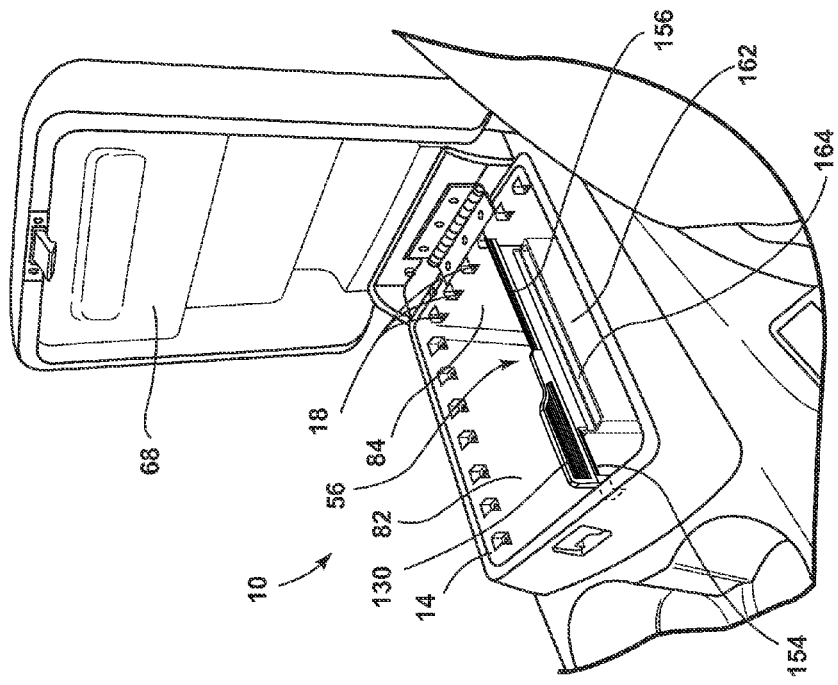
FIG. 17A is a top perspective view of the center console having the lid in the open position and the hanging storage module, according to one embodiment, engaged and spanning between opposing lateral side walls.
Figure 17:
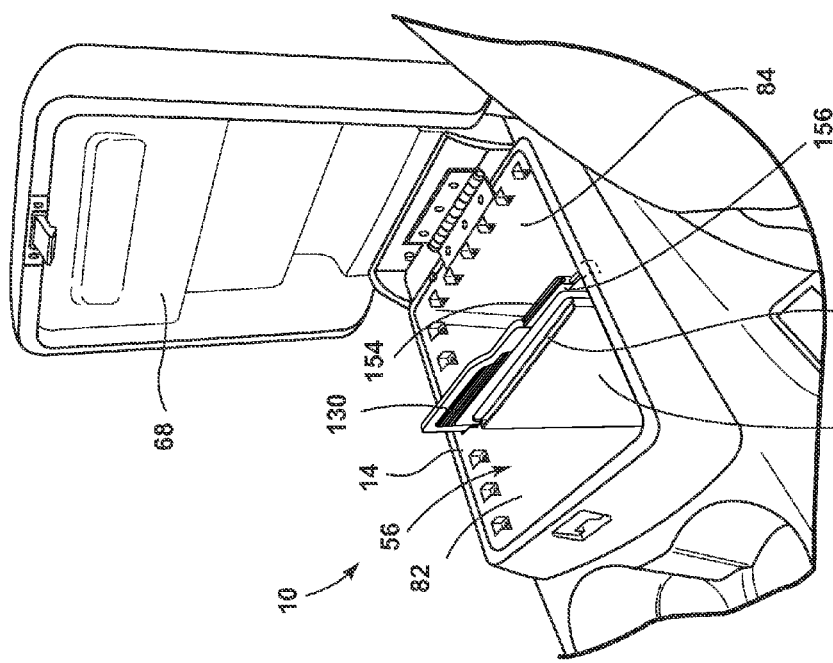
FIG. 17 is a top perspective view of the center console having a lid in the open position and a hanging storage module, according to one embodiment, engaged and spanning between opposing longitudinal side walls.

Referring now to the embodiment shown in FIGS. 15-17A, an elongated member 152 includes a first section 154 having the one of the support elements 112 on the first end and a second section 156 having the other support element 112 on the second end. The first section 154 is slidably coupled with the second section 156 to adjust a length of the elongated member 152 from a first length configured to expand between the opposing longitudinal side walls 82 (FIG. 17) and a second length configured to span between the opposing lateral side walls 84 (FIG. 17A). As shown, the first section 154 includes an embodiment of the vertical tab 130 with the slot 142, as described above, and the second section 156 includes a bottom groove 158 that slidably receives a bulbous end 160 of an alternative embodiment of the body portion 162 of the hanging storage module 20. The body portion 162, as illustrated, has a single pocket with an opening 164 near the upper edge for storing items, such as a tablet computer or other similarly shaped objects. To effectuate the sliding engagement between the first and second sections 154, 156, the first section 154 has a downward protrusion 166 and the second section has a C-shaped channel 168 that engages the downward protrusion 166 with enough friction to retain the first section 154 from moving relative to the second section 156 under normal operating conditions of the vehicle 34, but still allow a person to slide the first and second sections 154, 156 relative to each other, without tools, to adjust the length of the elongated member 152. It is contemplated that the shape of the first and second sections 154, 156 may be reversed or alternatively arranged to effectuate the sliding and expanding feature. It is also understood that a locking or retention mechanism may be arranged between the first and second sections 154, 156 to selectively lock their positions relative to each other.

Figure 18:
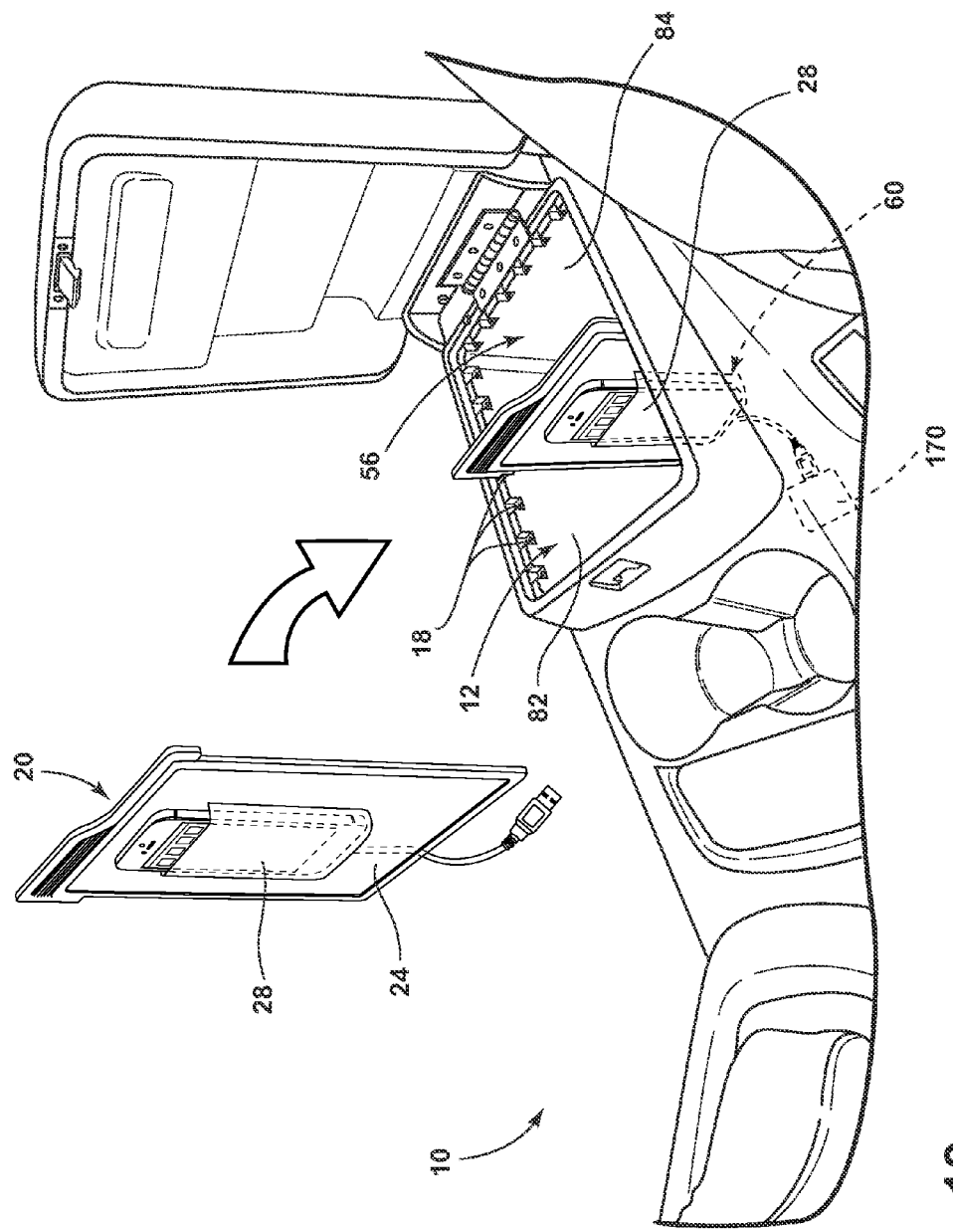
FIG. 18 is an additional embodiment of the hanging storage module being inserted into the interior volume of the compartment.

In an additional embodiment shown in FIG. 18, a electrical source 170 may be arranged proximate the floor 60 of the storage compartment 12. At least one pocket 28 on the ridged panel 24 of the hanging storage module 20 may be configured to hold a portable electronic device, and the electronic device may then electrically couple with the electrical source 170. In one embodiment the electrical source 170 may be a data source for transferring communications between the device and the vehicle 34. In addition, the electrical coupling between the electrical source 170 and the portable electronic device may be to a power source, as illustrated with a cord, to charge the battery of the portable electronic device or to otherwise operate the device. Alternatively, the electrical source 170 may include an inductive charger that is positioned to create an electromagnetic field about one of the pockets 28 for interfacing with an inductive receiving coil attached to or part of the portable electronic device that is stored in the pocket. It is also conceivable the cord may extend from to the rigid panel 24 to then provide a docking station for the device within or as part of a storage pocket 28.

Figure 19:
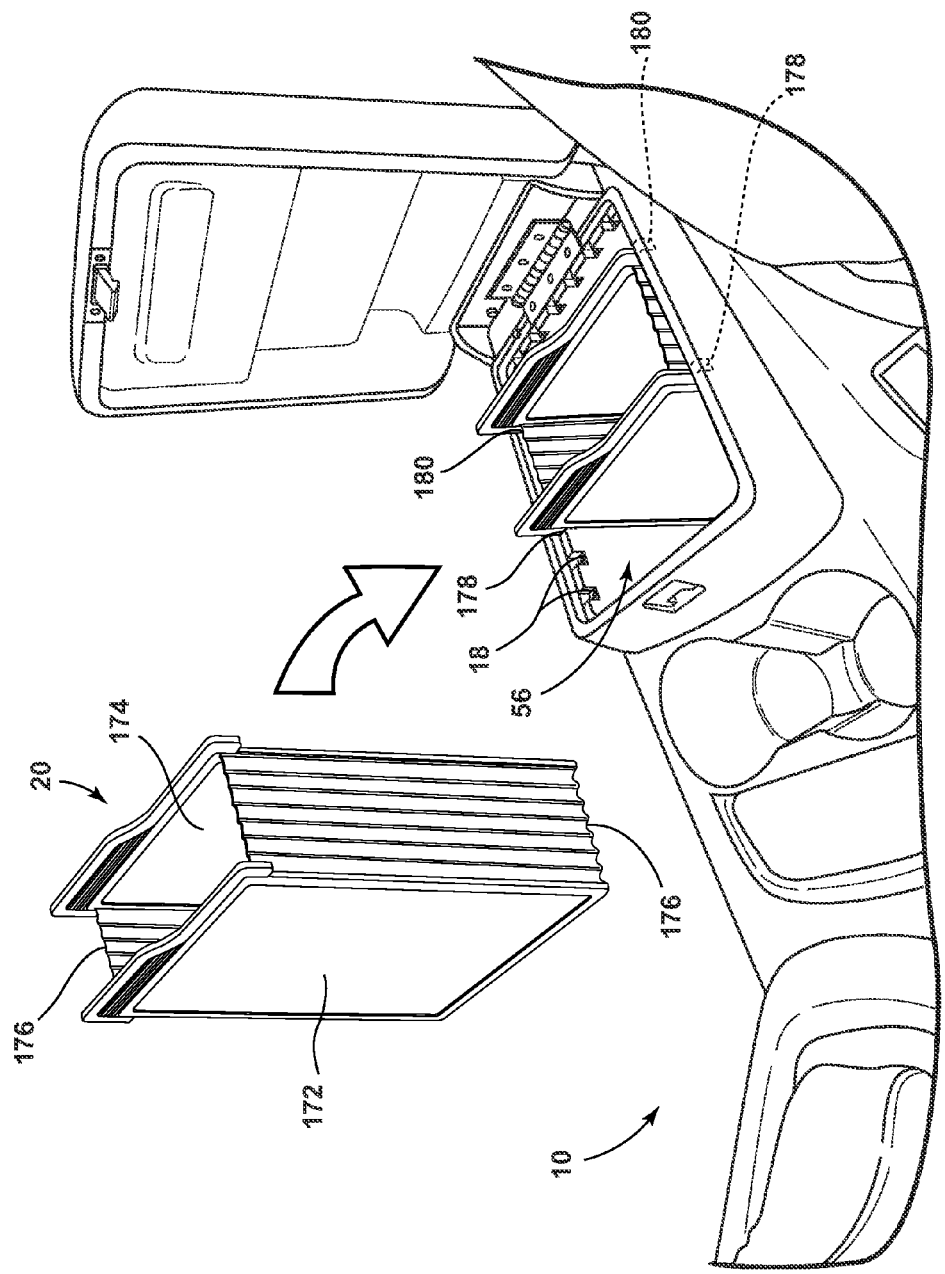
FIG. 19 is a top perspective view of yet an additional embodiment of the hanging storage module with an expandable storage area being inserted into the compartment.

Referring now to FIG. 19, yet another embodiment of the hanging storage module 20 is shown. In the illustrated embodiment the storage module includes 20 a first panel 172 and a second panel 174 that are attached with opposing flexible sides 176 to define an expandable storage pocket. The first and second panels 172, 174 are removably coupled with a separate pair of retention features 18. As shown, the first panel 172 is supported by a forward pair of retention features 178 and the second panel 174 is supported by a rearward pair of retention features 180 such that the expandable compartment has an expanded width equaling a distance between the forward and rearward retention features 178, 180. Therefore, either the first panel 172 or second panel 174 may be moved forward or rearward to engage an alternative set of retention features 18 and thereby reduce the width to the distance between the alternative set of retention features 18 and the remaining retention features 18 engaged. It is also conceivable that the hanging storage module 20 may have an adjustable depth and may include multiple division panels within the adjustable storage pocket.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle center console, comprising:
   a compartment having an edge surrounding a cavity;
   first and second retention features disposed on the edge on opposing sides of the cavity;
   an elongated member having first and second ends removably coupled with the first and second retention features;
   a rigid panel having a side portion with a storage pocket and a top portion coupled with the elongated member to hang in the cavity;
   a light source coupled with the edge of the compartment;
   wherein the light source transmits light through an aperture in the edge, wherein the elongated member includes a translucent portion for receiving light from the light source and emitting the light from an outer surface of the elongated member.

2. The vehicle center console of claim 1, wherein the first and second retention features each include a notch in the edge that have a depth to retain the first and second ends of the elongated member from sliding horizontally.

3. The vehicle center console of claim 1, wherein the compartment includes opposing longitudinal sidewalls and opposing lateral sidewalls that surround an interior volume of the cavity, and wherein the elongated member spans generally orthogonally between the opposing longitudinal sidewalls or the opposing lateral sidewalls.

4. The vehicle center console of claim 3, wherein the elongated member includes a first section having the first end and second section having the second end, wherein the first section is slidably coupled with the second section to adjust a length of the elongated member from a first length configured to span between the opposing longitudinal sidewalls and a second length configured to span between the opposing lateral sidewalls.

5. The vehicle center console of claim 1, further comprising:

a vertical tab slidably coupled with an upper surface of the elongated member and slidable between the first and second ends, wherein the vertical tab includes a friction element to secure the tab at a position between the first and second ends.

6. The vehicle center console of claim 1, further comprising:
a lid pivotally coupled with a rear portion of the container and movable between a closed position that substantially encloses the cavity and an open position that illuminates the light source.

7. A vehicle center console, comprising:
a compartment having an edge surrounding a cavity;
first and second retention features disposed on the edge on opposing sides of the cavity;
an elongated member having first and second ends removably coupled with the first and second retention features;
a rigid panel having a storage pocket and coupled with the elongated member to hang in the cavity; and
a light source coupled with the edge of the compartment;
wherein the elongated member includes a translucent portion for receiving light directly from the light source and emitting the light from an outer surface of the elongated member.

8. The vehicle center console of claim 7, wherein the light source transmits light through an aperture in the edge.

* * * * *